(12) United States Patent
Stratford et al.

(10) Patent No.: US 8,626,238 B2
(45) Date of Patent: Jan. 7, 2014

(54) METHOD AND APPARATUS FOR SWITCHING IN A TDD SYSTEM

(75) Inventors: Scott Stratford, Campbell, CA (US); Baljit Singh, San Jose, CA (US)

(73) Assignee: ADC Telecommunications, Inc., Shakopee, MN (US)

( * ) Notice: Subject to any disclaimer, the term of this patent is extended or adjusted under 35 U.S.C. 154(b) by 1359 days.

(21) Appl. No.: 12/144,977

(22) Filed: Jun. 24, 2008

(65) Prior Publication Data

US 2009/0318089 A1    Dec. 24, 2009

(51) Int. Cl.
*H04M 1/00* (2006.01)
*H04B 1/38* (2006.01)

(52) U.S. Cl.
USPC .............. 455/561; 455/560; 455/68; 455/69; 455/67.11; 455/67.13

(58) Field of Classification Search
USPC ......... 455/450, 451, 452.1, 452.2, 11.1, 13.1, 455/67.11, 67.13, 561, 436–445, 453, 68, 455/69, 560; 370/328–332
See application file for complete search history.

(56) References Cited

U.S. PATENT DOCUMENTS

| | | | |
|---|---|---|---|
| 6,760,303 B1 * | 7/2004 | Brouwer ........................ 370/229 |
| 6,823,187 B2 * | 11/2004 | Hamabe ......................... 455/454 |
| 7,039,410 B2 * | 5/2006 | Jovanovic ...................... 455/444 |
| 7,961,689 B2 | 6/2011 | Stratford |
| 8,009,577 B2 * | 8/2011 | Karam et al. .................. 370/252 |
| 8,208,414 B2 | 6/2012 | Singh et al. |
| 2005/0041605 A1 * | 2/2005 | Benson ......................... 370/280 |
| 2006/0178162 A1 | 8/2006 | Utakouji et al. |
| 2007/0201402 A1 | 8/2007 | Cho et al. |
| 2008/0239978 A1 * | 10/2008 | Karam et al. .................. 370/252 |
| 2009/0316609 A1 | 12/2009 | Singh |
| 2009/0316611 A1 | 12/2009 | Stratford et al. |

FOREIGN PATENT DOCUMENTS

| | | |
|---|---|---|
| CN | 101090557 | 12/2007 |
| WO | 2007074949 | 7/2007 |
| WO | WO 2007/074949 | * 7/2007 |

OTHER PUBLICATIONS

U.S. Appl. No. 12/144,913 "System and Method for Configurable Time-Division Duplex Interface", Inventors: Singh et al. filed Jun. 24, 2008.
U.S. Appl. No. 12/144,939 "System and Method for Synchronized Time-Division Duplex Signal Switching", Inventors: Singh et al. filed Jun. 24, 2008.

(Continued)

Primary Examiner — Tuan A Tran
(74) Attorney, Agent, or Firm — Fogg & Powers LLC (57) ABSTRACT

A method of switching a communication device between an uplink communication path and a downlink communication path is provided. The method measures a power level of signals on at least one radio frequency for one of the uplink communication path and the downlink communication path. The measured power level is compared with a threshold power level. Switching between an uplink circuit and a downlink circuit is based on the comparison between the measured power level and the threshold power level.

24 Claims, 7 Drawing Sheets

(56) References Cited

OTHER PUBLICATIONS

U.S. Appl. No. 12/144,961 "Method and Apparatus for Frame Detection in a Communication System", Inventors: Stratford et al filed Jun. 24, 2008.
U.S. Appl. No. 12/208,971 "Method and Apparatus for Determining an End of a Subframe in a TDD System", Inventors: Stratford et al. filed Sep. 11, 2008.
International Searching Authority, "International Search Report", Jan. 29, 2010, Published in: WO.
Japan Patent Office, "Notification of Reasons for Rejection", "from Foreign Counterpart of U.S. Appl. No. 12/144,977", Apr. 23, 2013, pp. 1-3, Published in: JP.
Chinese Patent Office, "Office Action", "from Foreign Counterpart of U.S. Appl. No. 12/144,977", May 6, 2013, pp. 1-34, Published in: CN.

* cited by examiner

METHOD AND APPARATUS FOR SWITCHING IN A TDD SYSTEM

CROSS REFERENCE TO RELATED APPLICATIONS

This application is related to the following applications filed on even date herewith, which are hereby incorporated herein by reference: U.S. patent application Ser. No. 12/144,961, entitled "METHOD AND APPARATUS FOR FRAME DETECTION IN A COMMUNICATIONS SYSTEM"; U.S. patent application Ser. No. 12/144,939, entitled "SYSTEM AND METHOD FOR SYNCHRONIZED TIME-DIVISION DUPLEX SIGNAL SWITCHING;"; and U.S. patent application Ser. No. 12/144,913, entitled "SYSTEM AND METHOD FOR CONFIGURABLE TIME-DIVISION DUPLEX INTERFACE".

BACKGROUND

Communication equipment in a Time-Division Duplexing (TDD) system must be coordinated to switch between uplink and downlink communication at the proper times to enable a properly functioning TDD system. Generally, a host unit coordinates the switching times and the host unit transmits information to wireless terminals regarding the switching times. The wireless terminals use the information to determine when to switch, such that communications from the wireless terminals do not collide with communications from the host unit.

In addition to the host and wireless terminals, equipment within the communication network that relays/transmits information between the host unit and the wireless terminal may also need to switch between uplink and downlink communications. In some systems, this network equipment does not have the circuitry required to properly receive, filter, and decode the information signals from the host unit regarding when to switch between upstream and downstream communication.

SUMMARY

The following summary is made by way of example and not by way of limitation. In one embodiment, a method of switching a communication device between an uplink communication path and a downlink communication path is provided. The method measures a power level of signals on at least one radio frequency for one of the uplink communication path and the downlink communication path. The measured power level is compared with a threshold power level. Switching between an uplink circuit and a downlink circuit is based on the comparison between the measured power level and the threshold power level.

In accordance with common practice, the various described features are not drawn to scale but are drawn to emphasize specific features relevant to the present disclosure.

DETAILED DESCRIPTION

Figure 1:
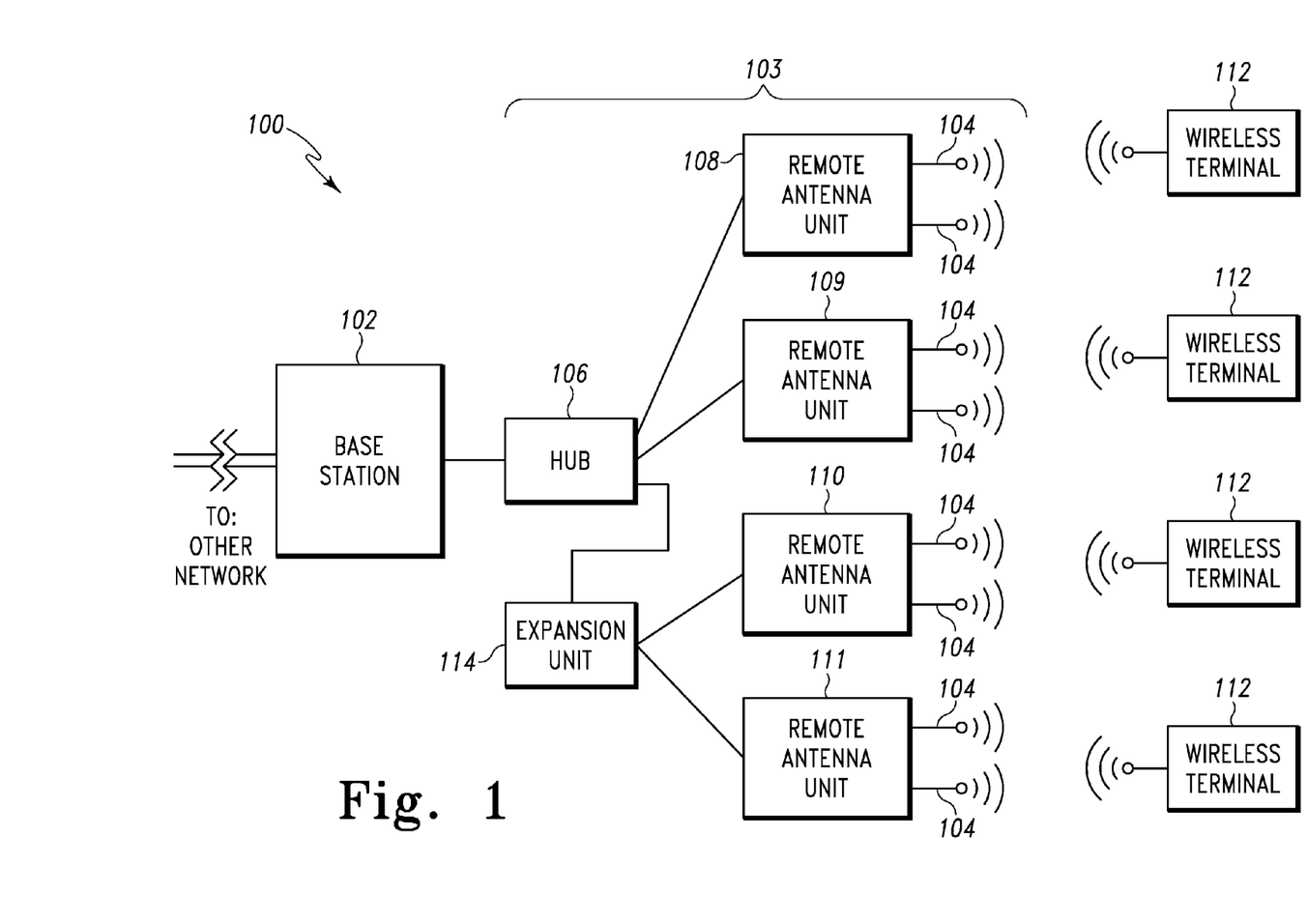
FIG. 1 is a block diagram of one embodiment of a communication system for switching between uplink and downlink transmissions.

FIG. 1 is a block diagram of one embodiment of a communication network 100. In the embodiment shown in FIG. 1, communication network 100 comprises a base station 102 which is communicatively coupled to a distributed antenna system (DAS) 103. In other embodiments, DAS 103 is used to transport radio frequency signals between one or more upstream devices (for example, base station transceiver 102, wireless access points, or other sources of radio frequency signals) and one or more downstream wireless devices (for example, wireless terminals 112). In some embodiments, base station transceiver 102 (also referred to herein as "base station" 102) is a part of a telecommunication-service providers' infrastructure and wireless terminals 112 comprise customer premise equipment. In general, for each radio frequency signal or channel over which base station 102 communicates with a downstream wireless terminal 112, an original downlink radio frequency signal is originally transmitted by base station 102 for reception by one or more wireless terminals 112 and an original uplink radio frequency signal is originally transmitted by a wireless terminal 112 for reception by base station 102.

Base station 102 manages communication among wireless terminals 112, and between wireless terminals 112 and other communication networks (not shown) that are coupled to base station 102. In one embodiment, base station 102 manages communication between wireless terminals 112 and a public switched telephone network (PSTN). In this embodiment, for example, communication network 100 is a cellular/PCS system and base station 102 communicates with a base station controller which acts as a voice/PSTN gateway to the PSTN. In another embodiment, base station 102 manages communication between wireless terminals 112 and an internet protocol (IP)-based network (such as the internet) via communication with an IP gateway. In this embodiment, base station 102 performs baseband processing on IP data from an IP gateway and places the IP data onto a channel. In one embodiment, base station 102 is an IEEE 802.16 compliant base station. Optionally, base station 102 may also meet the requirements of WiMax, WiBro, LTE, or other consortium. In yet other embodiments, base station 102 comprises multiple functionalities including managing communications between both a PSTN and an IP-based network.

DAS 103 comprises a hub 106 communicatively coupled to base station 102, and four remote antenna units 108-111 located remotely from and communicatively coupled to hub 106. Each remote antenna unit 108-111 includes one or more antennas 104 which are used to communicate wirelessly with wireless terminals 112. In this embodiment, hub 106 is optically coupled to base station 102, although in other embodiments, hub 106 and base station 102 are communicatively coupled by coaxial cables, wireless antennas, or other communication medium. Similarly, in this embodiment, hub 106 is optically coupled to each remote antenna unit 108-111, although in other embodiments, hub 106 and remote antenna units 108-111 are communicatively coupled by coaxial cables, wireless antennas, or other communication medium. In this embodiment, each of remote antenna units 108-111 includes two antennas 104, a primary antenna and a diversity antenna; although in other embodiments only a single antenna 104 or more than two antennas 104 are used at each remote antenna unit 108-111. In one embodiment, DAS 103 also includes one or more expansion units 114 that are communicatively coupled between hub 106 and remote antenna units 110, 111 to, for example, provide coverage for each floor of a multi-floor building.

Base station 102 uses DAS 103 to communicate with wireless terminals 112 via antennas 104. Bidirectional communication between base station 102 and the plurality of wireless terminals 112 is accomplished through use of a multiple access scheme. In one embodiment, base station 102 and wireless terminals 112 communicate using a code-division multiple access (CDMA) scheme. In another embodiment, base station 102 and wireless terminals 112 communicate using an orthogonal frequency division multiple access (OFDMA) scheme. In other embodiments, other multiple access schemes are used (e.g. TDMA, FDMA), or more than one multiple access scheme is used including, for example, CDMA for voice communications and OFMDA for data communications.

In one embodiment, some or all communications between base station 102 and wireless terminals 112 use a time division duplex (TDD) communication scheme. TDD schemes enable bi-directional communication between two devices by having uplink transmissions (from wireless terminal 112 toward base station 102) and downlink transmissions (from base station 102 toward wireless terminal 112) occur at different times. In this embodiment, both uplink and downlink communications share the same frequencies.

Although in the embodiment shown in FIG. 1, a single base station 102 and hub 106 are shown, it should be understood that in other embodiments a plurality of base stations 102 and/or hubs 108 are used. Additionally, although in this embodiment a certain number of remote antenna units 108-111 are coupled to hub 106, in other embodiments other numbers of remote antenna units 108-111 are coupled to hub 106.

The following description is directed towards a system based on the TDD scheme described in the IEEE 802.16 standard, however, it should be understood that the scope of the present disclosure is intended to include other embodiments, with appropriate adjustments, modifications, and substitutions to the systems and methods described for application to other TDD schemes.

System 100 enables communication between wireless terminals 112 and one or more other devices which are communicatively coupled to base station via, for example, a PSTN or internet based network. Wireless terminals 112 transmit/receive signals to/from remote antenna units 108-111 via remote antennas 104. In this embodiment, wireless terminals 112 each communicate with one remote antenna unit 108-111 at a time, except for during certain situations, for example during handoffs. For example, information which is outgoing from a wireless terminal 112 is transmitted by the wireless terminal 112 and received at, for example, remote antenna unit 108 which is communicating with the transmitting wireless terminal 112. Remote antenna unit 108 reproduces the signal received from wireless terminal 112 and sends the signal along with other signals received from other wireless terminals 112 transmitting to remote antenna unit 104 to hub 106. Hub 106 receives information from remote antenna unit 108 (and other remote antenna units 109-111, some through expansion unit 114) reproduces the signals received and sends the signals to base station 102. Base station 102 processes the information and transmits the information toward its destination. Incoming information from another network is received by base station 102. Base station 102 forwards the incoming signals to remote antenna units 108-111 through, for example, hub 106. Hub 106 receives the signal, reproduces the signal, and sends the signal to remote antenna units 108-111. In one embodiment, the same downlink signal is sent to each remote antenna unit 108-111. In an alternative embodiment, base station 102 determines which of wireless terminals 112 is the destination of the information, generates, modulates, and sends a signal containing the information to hub 106 which sends the information to remote antenna unit 108 which is communication with the destination wireless terminal 112. Here, hub 106 receives the signal, reproduces the signal, and sends the signal to remote antenna unit 108. In either case, remote antenna unit 108 receives the signal from hub 106, reproduces the signal, and sends the signal wirelessly. Wireless terminal 112 then receives the wireless signal and the information therein is received and processed. In this embodiment, for both uplink and downlink communications, hub 106 and remote antenna units 108-111 do not demodulate or unpack the signals transmitted by base station 102 and wireless terminals 112. Instead hub 106 and remote antenna units 108-111 act as relays, receiving and reproducing the signals received while performing only minimal processing on the signals.

Figure 2:
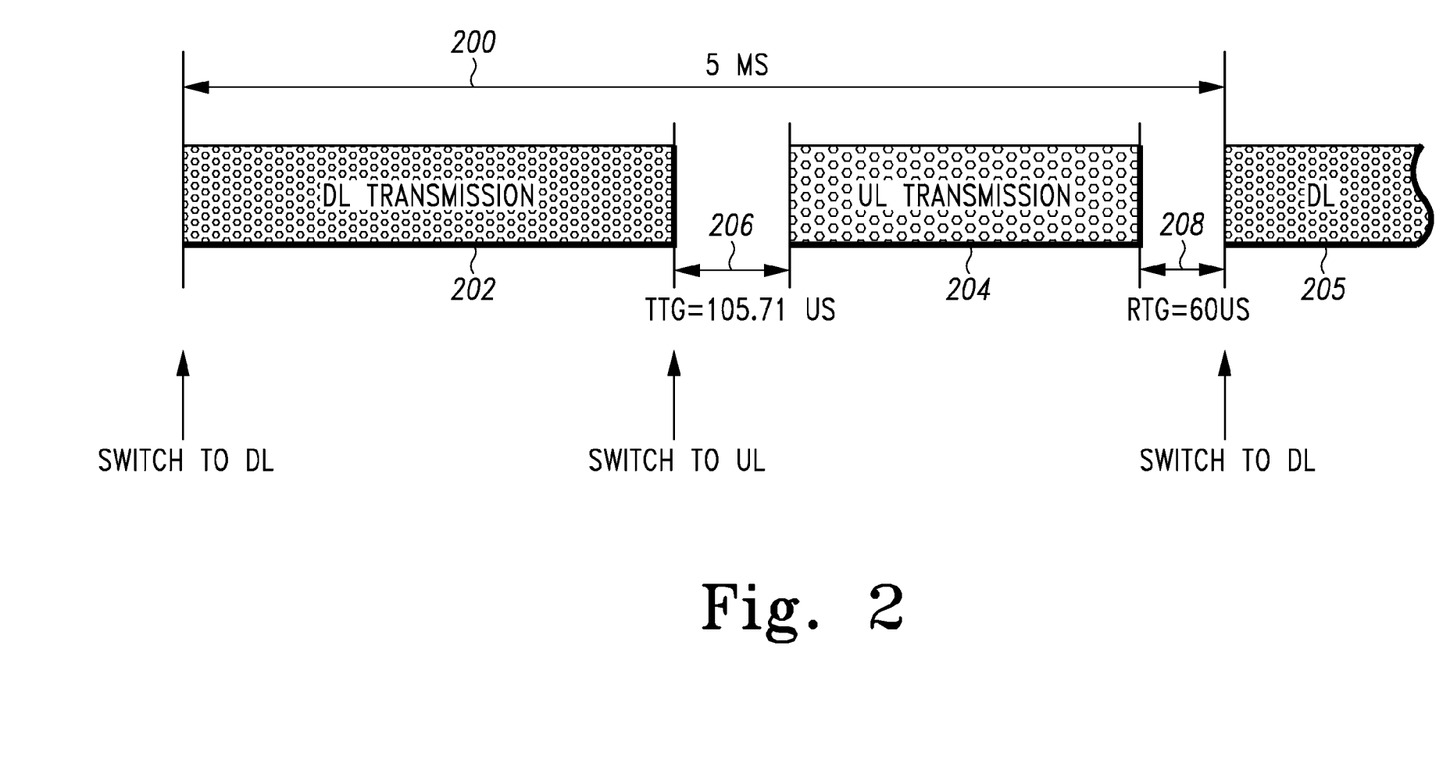
FIG. 2 is a diagram of one embodiment of a frame structure.

FIG. 2 illustrates one example of a TDD transmission structure 200. In the embodiment illustrated in FIG. 2, transmission structure 200 comprises a frame (also referred to herein at "frame" 200) having a downlink (DL) subframe 202 followed by an uplink (UL) subframe 204. A portion of a second downlink subframe 205 of a subsequent TDD frame is also shown. Each start or end of a transmission is referred to herein as a transmission boundary. In this embodiment, each TDD frame 200 is substantially similar in structure having a 5 ms fixed duration and containing one downlink subframe followed by one uplink subframe. In some embodiments, a portion of TDD frame 200 is allocated for control data. In other embodiments, TDD frame 200 may have a variable duration, and/or multiple uplink or downlink subframes may be included within each frame 200. Additionally, other embodiments may have an uplink subframe first which is followed by a downlink subframe, or a variation across frames between uplink and downlink subframes starting each frame.

The beginning portion of TDD frame 200 is allocated to downlink subframe 202. At the end of the downlink subframe 202, a time gap (TTG) 206 occurs before the start of uplink subframe 204. Then, uplink subframe 204 begins, and another time gap (RTG) 208 occurs between the end of uplink subframe 204 and the beginning of the subsequent downlink subframe 205 of the next frame.

During downlink subframe 202, base station 102 is transmitting to one or more of wireless terminals 112. During uplink subframe 204 one or more of wireless terminals 112 are transmitting to base station 102. TTG 206 between downlink subframe 202 and uplink subframe 204 allows time for base station 102 to switch from transmit to receive mode and for each wireless terminal 112 to switch from receive to transmit mode. Likewise, RTG 208 allows time for base station 102 to switch from receive to transmit mode and wireless terminals 112 to switch from transmit to receive mode. TTG 206 and RTG 208 also allow time margin for such things as base station/mobile synchronization and propagation delay determination/adjustment.

In addition to base station 102 and wireless terminals 112, the RF circuitry within DAS 103 also switches between processing downlink transmissions and uplink transmissions. Similar to base station 102 and wireless terminals 112, the switching of the RF circuitry within DAS 103 occurs during time gaps TTG 206 and RTG 208. The RF circuitry within hub 106 as well as RF circuitry within each remote antenna unit 108-111 performs the uplink and downlink switching.

In one embodiment, each frame 200 has the same duty cycle, such that the duration of downlink subframe 202 and uplink subframe 204 are fixed. In an alternative embodiment, the duty cycle is variable such that the duration of downlink subframe 202 and uplink subframe 204 are variable on a frame-by-frame basis. For a variable duty cycle, the subframe durations are dynamically assigned during transmission based on system traffic, user preferences, or other parameters. For example, in one embodiment, frame 200 has 47 total frames and has predetermined downlink subframe lengths of 35, 34, and 33 symbols, and uplink subframe lengths of 12, 13, and 14 symbols as allowed by the communications protocol. A 35 symbol downlink subframe 202 corresponds to a 12 symbol uplink subframe 204. Regardless of the number of symbols in each subframe, the total number of uplink and downlink symbols remains at 47. Thus, if there are fewer symbols in a downlink subframe 202, there will be more symbols in the corresponding uplink subframe 204. In this embodiment, regardless of whether frames 200 are fixed or variable duty cycles, the time periods for TTG 206 and RTG 208 have a fixed duration.

Although in this embodiment, the communication structure used by system 100 is a frame which comprises two subframes as illustrated in FIG. 2, it should be understood that the scope of the present disclose is intended to include other frame/subframe structures and other communication structures as known to those skilled in the art.

Wireless terminals 112 obtain the timing of downlink subframe 202 and uplink subframe 204 from communications sent by base station 102. In one embodiment, these communications occur on a separate control channel and wireless terminals 112 listen to the control channel to obtain the frame and subframe timing. In another embodiment, wireless terminals 112 obtain the frame and subframe timing from messages sent by base station 102 within frame 200 or by listening to current transmissions on the payload channel and ascertaining the timing directly from the transmissions. In any case, wireless terminals 112 determine at what time of each frame 200 begins, when downlink subframe 202 will end, when to switch from receiving mode to transmitting mode, and at what point to start transmitting uplink subframe 204. In this embodiment, however, hub 106 and remote antenna units 108-111 do not have the circuitry required to demodulate and unpack signals transmitted between base station 102 and wireless terminals 112. Thus, in one embodiment, hub 106 and remote antenna units 108-111 have circuitry included for independently determining the timing of the frames and subframes.

Figure 3:
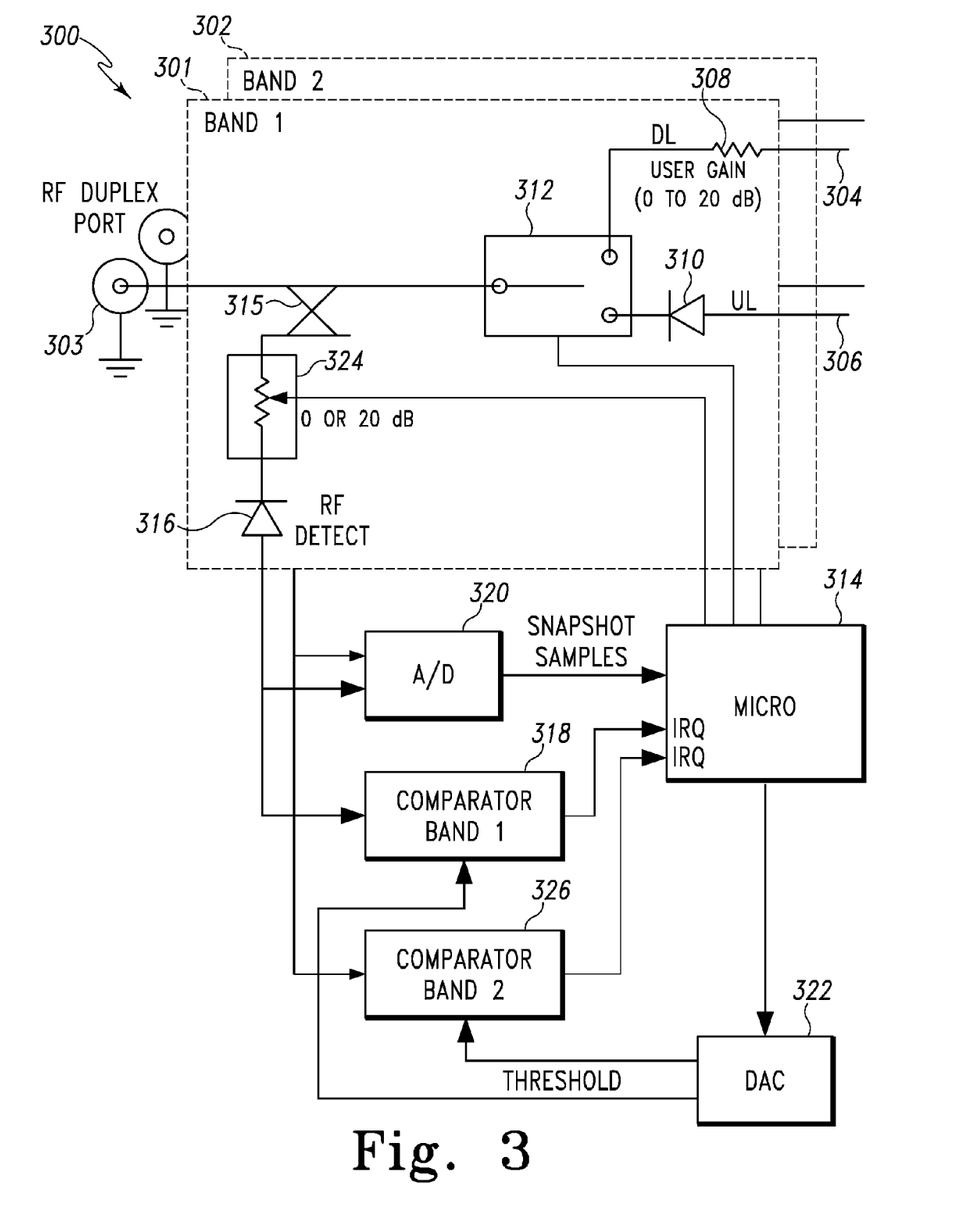
FIG. 3 is a block diagram of one embodiment of a communications circuit for switching between uplink and downlink transmissions.

FIG. 3 illustrates one embodiment of a circuit 300 for determining the location in time of a boundary of a transmission structure in communications network 100. In the embodiment shown in FIG. 3, circuit 300 determines a location in time of a subframe boundary (subframe timing) based on the power level of signals that are transmitted within network 100. Based on the determined subframe timing, circuit 300 determines when to switch between downlink and uplink transmission. For example, in one embodiment, circuit 300 determines the location in time of the end boundary for downlink subframe 202 and switches from downlink transmission to uplink transmission based on the end boundary of downlink subframe 202.

Circuit 300 detects signals currently being transmitted on network 100 (for example, between base station 102 and other wireless terminals not shown) and compares the power level of the detected signals with a threshold to determine the timing of a subframe boundary. In one embodiment, circuit 300 determines an end boundary for a subframe by detecting the falling edge of the power level of a subframe in a detected signal in real-time. In other embodiments, a starting threshold is detecting a rising edge of the power level of a subframe in a detected signal in real-time. As should be evident from the description above and below, the apparatuses and methods described herein can be used to determine the frame and/or subframe timing of a system as desired for a particular system.

In one embodiment, both hub 106 and remote antenna units 108-111 comprise circuits such as circuit 300 to switch between uplink and downlink transmission modes. In an alternative embodiment, circuit 300 is included only within hub 106. Here, hub 106 determines the switching times for itself, as well as remote antenna units 108-111, and forwards control signals indicating the time for switching to remote antenna units 108-111 as described in co-pending application Ser. No. 12/144,939, entitled "SYSTEM AND METHOD FOR SYNCHRONIZED TIME-DIVISION DUPLEX SIGNAL SWITCHING" which is hereby incorporated herein by reference.

In the embodiment shown in FIG. 3, circuit 300 processes the signals of two frequency bands. Circuit 301 processes signals of a first frequency band and circuit 302 processes signals of a second frequency band. In this embodiment, circuit 301 and 302 are similar, with the exception of minor differences to enable each circuit 301, 302 to support its respective frequencies. Thus, only circuit 301 is described in detail. In other embodiments, only one frequency band is supported. In still other embodiments, more than two frequency bands are supported.

On circuit 301 signals are transmitted and received to/from base station 102 at RF duplex port 303. Signals to/from wireless terminals 112 are transmitted and received at downlink (DL) port 304 and uplink (UL) port 306 respectively. Downlink port 304 and uplink port 306 are coupled to one or more antennas 104 which transmit and receive wireless signals from wireless terminals 112. A variable resistor 308 controls the power of downlink signals transmitted from downlink port 304. On the uplink side, an amplifier 310 amplifies signals received from wireless terminals 112 for further processing and transmission to base station 102. A switch 312 switches circuit 300 between uplink transmission (uplink mode) and downlink transmission (downlink mode) by coupling RF duplex port 303 to either downlink port 304 or uplink port 306. In the embodiment shown in FIG. 3, switch 312 is a single pole, double throw switch having one common connection (coupled to duplex port 303) and two switched connections (coupled to downlink port 304 and uplink port 306 respectively). In an alternative embodiment, port 303 comprises two simplex ports which operate as a duplex port. More detail regarding the configuration of circuit 300 and port 303 as simplex or duplex is provided in co-pending application Ser. No. 12/144,913, entitled "SYSTEM AND METHOD FOR CONFIGURABLE TIME-DIVISION DUPLEX INTERFACE", which is hereby incorporated herein by reference.

Figure 4:
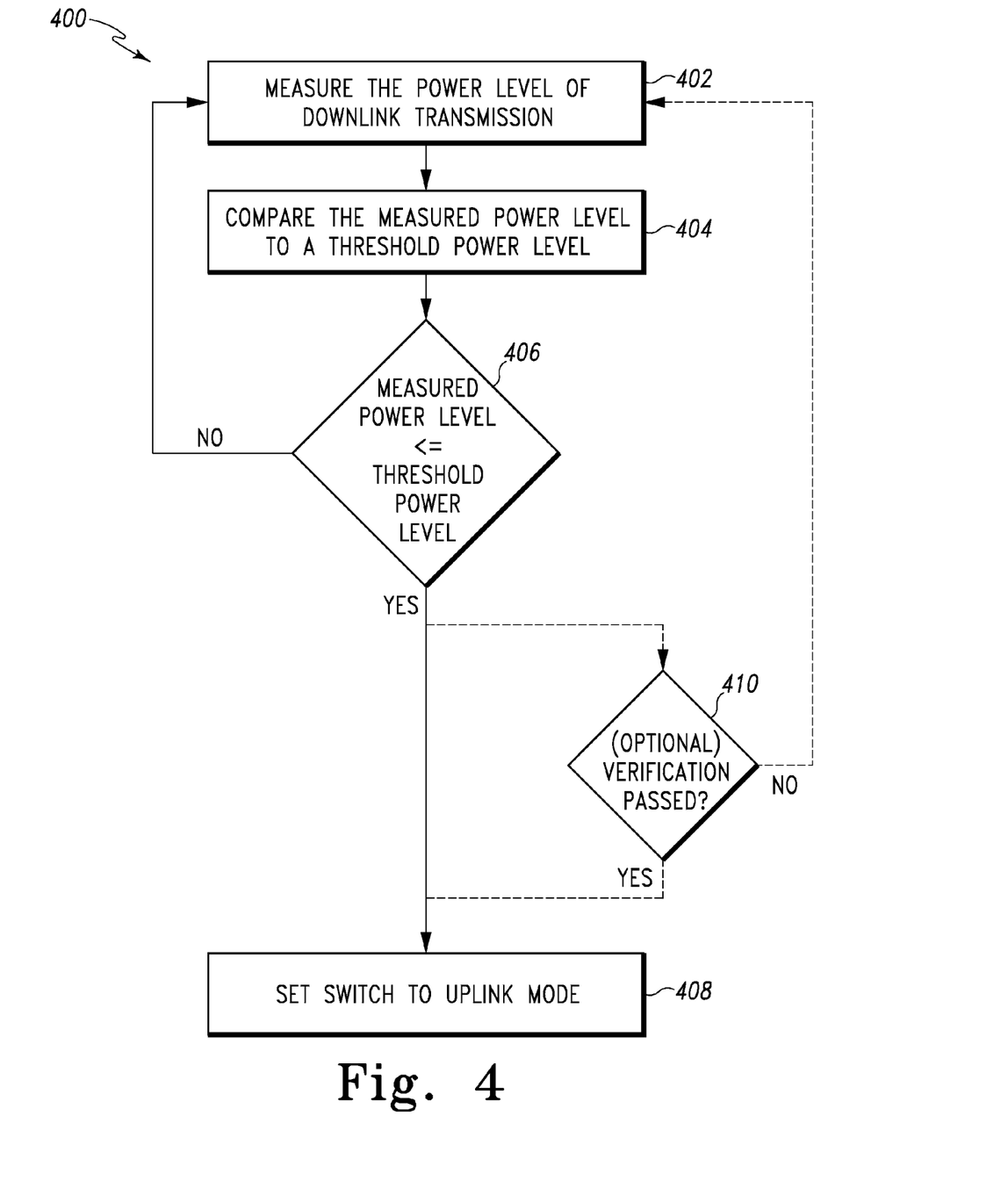
FIG. 4 is a flow chart illustrating one embodiment of a method of switching between uplink and downlink transmissions.

FIG. 4 illustrates one embodiment of a method 400 of switching circuit 300 between uplink and downlink transmission paths based on determining the end of downlink subframe 204. The following discussion relates to switching from downlink to uplink transmission, however, it should be understood that the methods and apparatus described herein could also be used with appropriate modifications to switch from uplink to downlink transmission. To determine when to switch between downlink and uplink transmission, the power level of the downlink signal is analyzed. During downlink subframe 202, the power level of the downlink signal in circuitry 300 is high, because signals are being transmitted by base station 102 and processed by circuitry 300. At the end of downlink subframe 202 the power level of the signal drops as the transmission ends. Circuit 300 detects the power level drop of the downlink signal, and determines the end of downlink subframe 202 based on the power level drop. In one embodiment, as soon as circuit 300 determines that downlink subframe 202 has ended, switch 312 is set to uplink mode. Circuit 300 is now ready to process uplink signals from wireless terminals 112 to base station 102 at the start of uplink subframe 204. In an alternative embodiment, the switch 312 is set to uplink mode, based on the end of downlink subframe 202 and the known duration of TTG 206 between downlink subframe 202 and uplink subframe 204. Here, switch 312 is switched to uplink mode just prior to the start of uplink subframe 204. In other embodiments, switch 312 is switched to uplink mode at a different time between the determined end of downlink subframe 202 and the start of uplink subframe 204.

Method 400 provides real-time switching of circuit 300 during operation. At block 402, the downlink signal received at circuit 300 is coupled to an RF detector 316 by a coupler 315, upstream of switch 312. RF detector 316 measures the power of the downlink signal, and at block 404, a comparator 318 senses RF detector 316 and compares the power level of the downlink signal measured by RF detector 316 to a reference threshold. At block 406, if the power level of the downlink signal has fallen equal to or below the reference threshold, comparator 318 sends an interrupt signal to a microprocessor 314. Microprocessor 314 controls switch 312 by setting switch 312 to either uplink mode or downlink mode. Based on the interrupt received from comparator 318, microprocessor 314 sets switch 312 to uplink mode, thus readying RF circuit 300 for uplink transmission. In one embodiment, once microprocessor 314 receives an interrupt from comparator 318, method 400 ends with block 408 at which microprocessor 314 sets switch 312 to uplink mode. As shown in FIG. 3, in this embodiment, microprocessor 314 also works with circuit 302 and thus receives interrupt signals from a second comparator 326 and controls a second switch (not shown) on circuit 302.

Referring back to block 406, if the power level of the downlink transmission is not less than or equal to the threshold power level, comparator 318 discards the measurement and method 400 returns to block 402 to measure the power level of the downlink signal again. Thus, as shown in FIG. 4, RF detector 316 is continually reading the power level from the downlink signal and comparator 318 is continually processing the output of RF detector 316 until an end of downlink subframe 202 is determined. Although in this embodiment the comparison between the measured power level and the threshold power level is a less than or equal to comparison, in other embodiments, other comparison techniques are used as known to those skilled in the art.

In one embodiment, method 400 also includes an optional verification process shown at block 410 before setting switch 312 to uplink mode at block 408. The verification process performs additional checks to reduce the effect of unintended power drops in the signal and increase the likelihood of switching at the actual end of downlink subframe 202. To perform verification, after block 406 when the measured power level has fall equal to or below the threshold power level, method 400 continues to block 410 and if the verification process is passed, method 400 continues to block 408 to set switch 312 to uplink mode. If the verification process determines that the measured power drop was not the end of a downlink subframe, method 400 continues back to block 402 to measure the power again. More detail regarding the verification process is included with respect to FIG. 5.

In one embodiment, circuit 300 also determines when to switch from uplink transmission to downlink transmission after uplink subframe 204 in a manner similar to that describe above. Thus, circuit 300 detects the end of uplink subframe 204 by measuring the power drop at the end of uplink transmissions. An interrupt is then sent to microprocessor 314 and microprocessor 314 sets switch 312 to downlink mode based on the interrupt.

In an alternative embodiment, circuit 300 determines when to switch from uplink transmission to downlink transmission for a first frame and then determines when to switch for subsequent frames based on the predictable timing of frame 200. Since each frame 200 is of the same duration and since the start of downlink subframe 202 coincides with the start of frame 200, circuit 300 determines the timing of the start of a first downlink subframe 202 and predicts the start of subsequent downlink subframes 202 based on that timing. Thus, circuit 300 is set to downlink mode to relay downlink transmissions from base station 102 to wireless terminals 112 in accordance with the frame and subframe timing of network 100.

In one embodiment, the start of a first downlink subframe 202 is determined by detecting the falling edge of the previous uplink subframe 204 as discussed above. In an alternative embodiment, the start of a first downlink subframe 202 is determined in a non-real time manner by correlating a detected signal with a reference signal. More detail regarding the determination of the start of a frame 200 through correlation and the prediction and switching between downlink transmission and uplink transmission based on the determination is provided in copending application Ser. No. 12/144, 961 titled "METHOD AND APPARATUS FOR FRAME DETECTION IN A COMMUNICATIONS SYSTEM"; referred to herein as the '921 App.) which is herby incorporated herein by reference.

Figure 5:
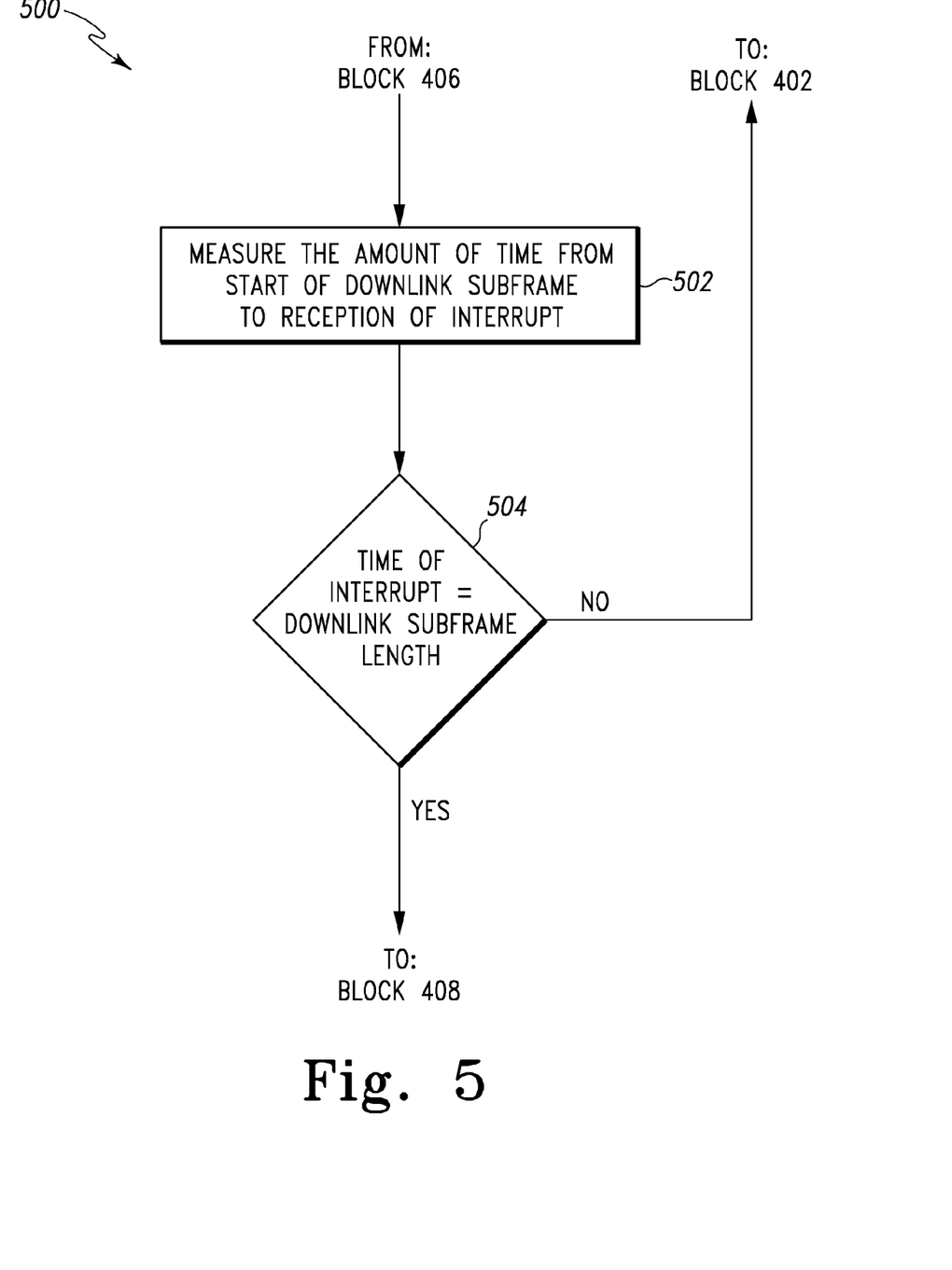
FIG. 5 is a flow chart illustrating one embodiment of a method of verifying determined end of transmission.
Figure 6:
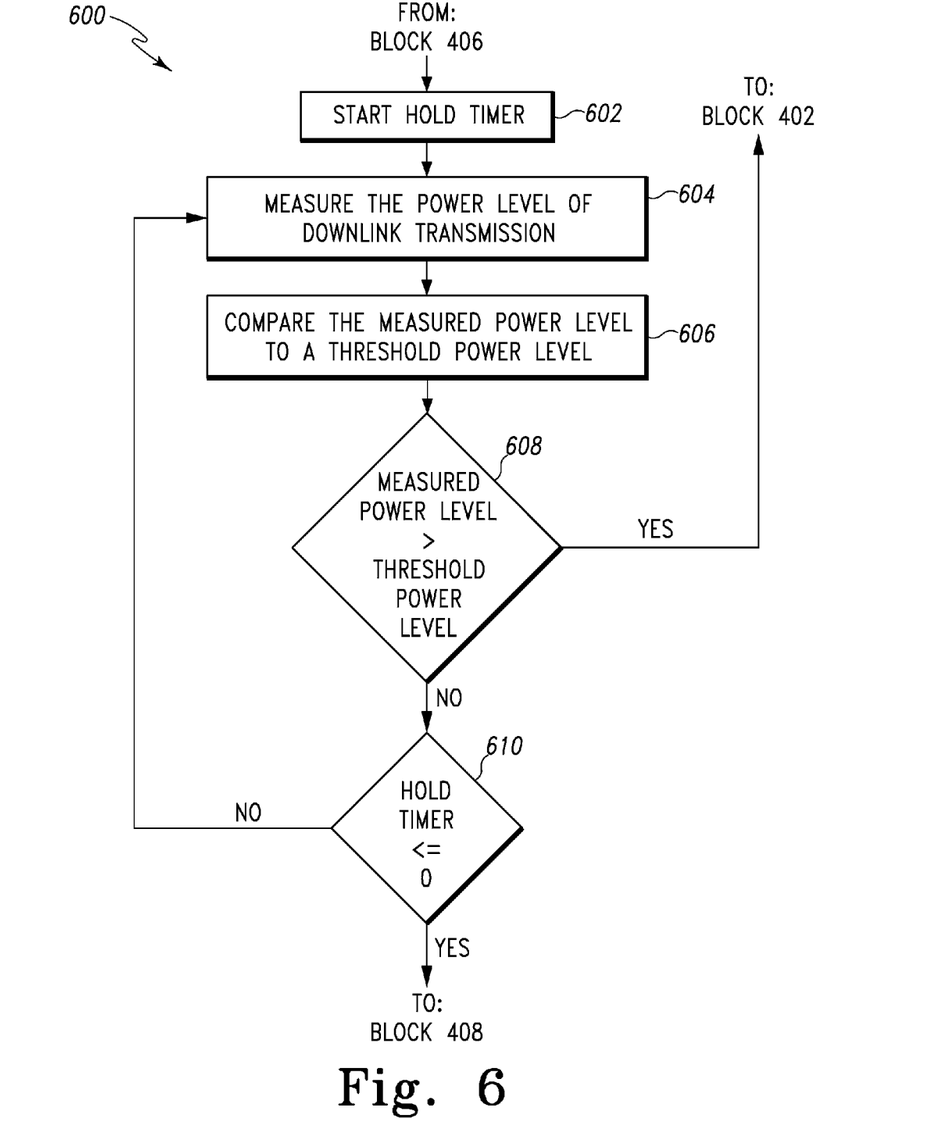
FIG. 6 is a flow chart illustrating one embodiment of another method of verifying a determined end of transmission.

FIGS. 5 and 6 illustrate embodiments of methods for a verification process for block 410 of method 400. In one embodiment, both of method 500 and method 600 are performed (either in parallel or contiguously) as the verification process of block 410. In another embodiment, only method 500 is performed. In yet another embodiment, only method 600 is performed.

Method 500 of FIG. 5 is one embodiment of method for checking if the measured power drop by RF detector 316 coincides with a known possible end of a downlink subframe. Here, the TDD system has predetermined combinations of downlink subframe 202 lengths and uplink subframe 204 lengths. Microprocessor 314 (or the firmware operating on microprocessor 314) uses the predetermined subframe lengths to check if the power drop detected occurred at a time that is a possible end of downlink subframe 202. For example, in one embodiment, the TDD system has predetermined downlink subframe lengths of 35, 34, and 33 symbols, and uplink subframe lengths of 12, 13, and 14 symbols. A 35 symbol downlink subframe 202 corresponds to a 12 symbol uplink subframe 204. Regardless of the number of symbols in each subframe, the total number of uplink and downlink symbols remains at 47. Thus, if there are fewer symbols in a downlink subframe 202, there will be more symbols in the corresponding uplink subframe 204.

Method 500 starts at block 502 where microprocessor 314 measures the amount of time from the start of downlink subframe until the reception of the interrupt. At block 504, microprocessor 314 compares this time period to the known possible downlink subframe lengths to determine whether the measured time period corresponds to a possible downlink subframe length. If the measured length does match with a possible downlink subframe length, microprocessor 314 acknowledges the interrupt received as marking the end of a downlink subframe 202 and the verification has passed. This results in method 400 continuing from block 410 of to block 408 where switch 312 is set to uplink mode. If the measured length does not match with a possible downlink subframe length, microprocessor 312 ignores the interrupt, and the verification process has failed. This results in method 400 returning to block 402. In one embodiment, the measured time period is determined to match a possible downlink subframe length if the measured time period falls within a window of a valid time period. For example, in one embodiment, a symbol is 100 microseconds in length, and the window is +/−10 microseconds.

As an illustrative example of method 500, if the measured time period is 33 symbols long (which is a valid downlink subframe length in this TDD system), microprocessor 314 acknowledges that the end of the downlink subframe has occurred and sets switch 312 to uplink mode. If, however, the measured time period is 31 symbols long (which is not a valid downlink subframe length), microprocessor 314 ignores the interrupt received, and switch 312 remains in downlink mode.

In one embodiment, the time period for the length of downlink subframe is measured by starting a counter at the start of the frame 200 and checking the counter at the reception of the interrupt. The start of a frame 200 can be determined by, for example, the methods and systems described in the '921 App. In other embodiments, the time period is determined by counting the number of symbols, or in other ways as known to those skilled in the art. In one embodiment, when a time period equal to the longest valid downlink subframe length elapses (e.g. 35 symbols), microprocessor 314 automatically sets switch 312 to uplink mode, regardless of whether an interrupt has been received.

Method 600 of FIG. 6 is one embodiment of a method for checking whether a detected power level drop is an end of a transmission, and not an unintended power drop of signals. Method 600 checks the detected power level drop by holding for a period of time after the detected power level drop, and checking if the power level of the downlink signal increases above the threshold during the period of time. After a falling edge interrupt is received at microprocessor 314, microprocessor 314 starts a timer which counts down for a period of time (for example, 3 microseconds) and microprocessor 314 checks for a rising edge interrupt from comparator 318. In method 600, RF detector 316 and comparator 318 are continually reading the power level of signals on circuit 300 even after block 406 has determined that the measured power level of the downlink signal has fallen equal to or less than the threshold. After dropping below the threshold, if the power level raises back above the threshold, comparator 318 sends an interrupt to microprocessor 314.

Method 600 begins at block 602 which follows block 406 in FIG. 4. At block 602 the hold timer is started. At block 604, RF detector 316 measures the power level of signals on circuit 300. At block 606, comparator 318 compares the measured power level to the threshold power level. At block 608, if the measured power level is greater than the threshold power level, comparator 318 sends an interrupt to microprocessor 314, and the verification has failed. Because the power level rose above the threshold again within a short time after falling, the transmission is likely still continuing and the measured power drop was an unintended power drop during transmission. When this occurs method 400 ignores the first power level drop measured, and returns to block 402. If, the measured power level is not greater than the threshold, the measured power is still low which coincides with an end of transmission. At block 610, method 600 checks whether the timer has reached zero. If the timer has not reached zero, method 600 returns to block 604 to measure the power again. If the timer has reached zero, method 600 ends, the verification of the end of transmission has passed, and switch 312 is set to uplink mode at block 408.

Figure 7:
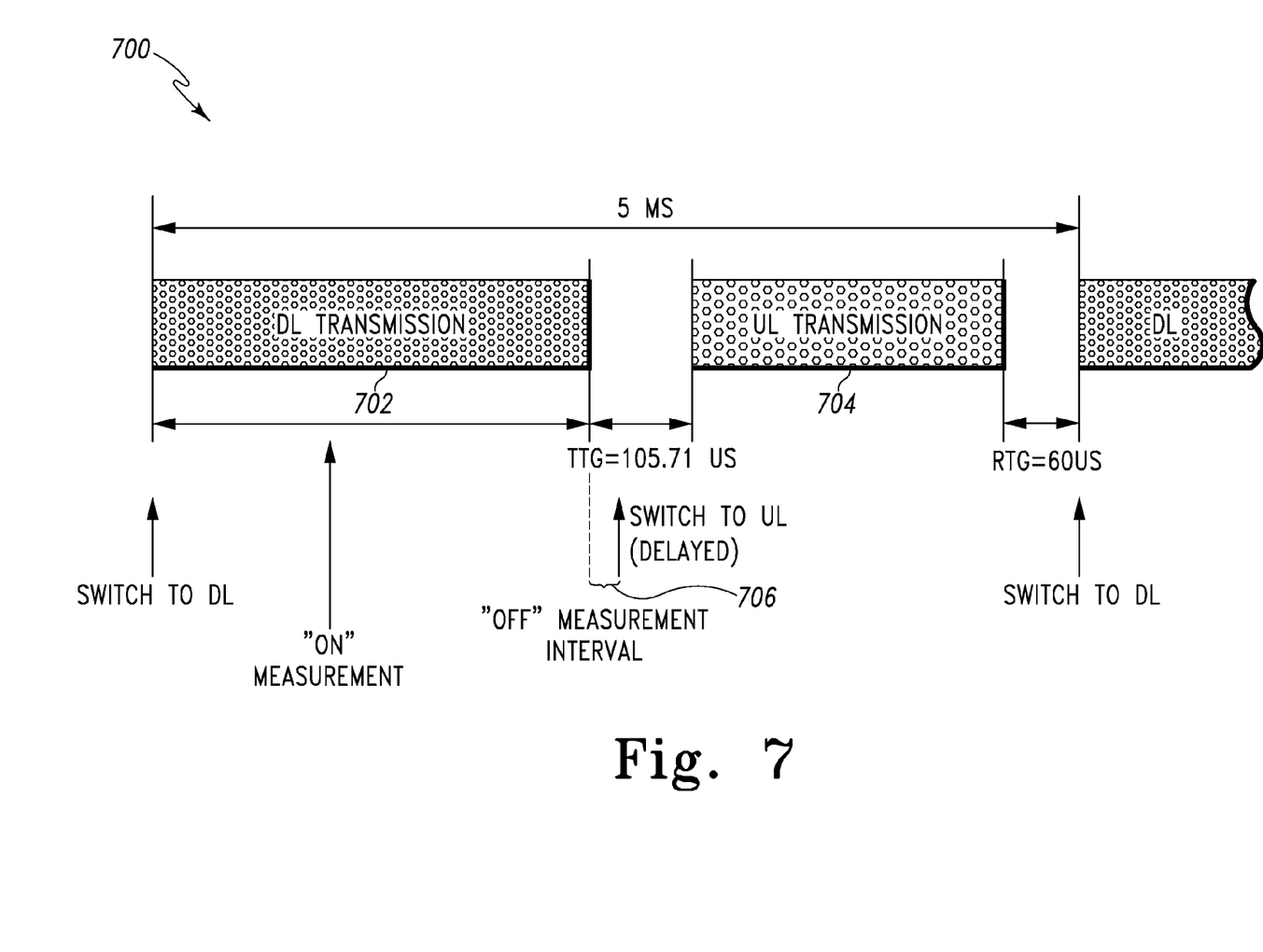
FIG. 7 is a diagram of one embodiment of a frame structure showing the timing of power measurements.

Referring now to FIG. 7, a frame diagram 700 is shown illustrating one embodiment of the timing of "on" and "off" signal measurements for determination of the threshold power level. As mentioned above, the determination of when to switch circuit 300 is made by comparing (in comparator 318) the received power level to a threshold power level. In one embodiment, the threshold power level is determined by microprocessor 314 and programmed into comparator 318. To determine the threshold power level, microprocessor 314 measures the power level seen by RF detector 316 when the downlink signal is known to be "on" (present on circuit 300) and again when the downlink signal is known to be "off" (not present on circuit 300).

In one embodiment, these power level measurements are taken during a time of static frame duty cycles, such that the duration of downlink subframe 702 and uplink subframe 704 is fixed and does not change from one frame to the next. During static duty cycles, the start time of downlink subframe 702 as well as uplink subframe 704 is known, and the firmware operating on microprocessor 314 automatically sets switch 312 to either downlink mode or uplink mode at their respective times. During these static frame intervals, the "on" power level is measured during downlink subframe 702. In one embodiment, the power levels of the downlink signals are determined from snapshots of the downlink signal taken by an analog to digital (A/D) converter 320. A/D converter 320 reads the power level from RF detector 316 and converts the power level to a digital number for microprocessor 314.

To obtain an accurate "off" power level, the "off" measurement is taken when no transmissions from either base station 102 or wireless terminals 112 are being received. The "off" power level cannot be reliably measured during the uplink transmission due to possible coupling of the uplink signals into RF detector 316. To reduce the possibility of transmissions are being coupled into RF detector 316, at the end of a downlink subframe 704, microprocessor 314 holds for a time interval 706 (e.g. a few microseconds) before setting switch 312 to uplink mode. Delaying for time interval 706 reduces the possibility of errant uplink signals being coupled into RF detector 316. During time interval 706, RF detector 316 takes the "off" measurement and A/D converter 320 provides the data to microprocessor 314.

Microprocessor 314 then uses the "on" and "off" readings from A/D converter 320 to compute the threshold power level. In one embodiment, multiple "on" and "off" readings are taken by A/D converter 320, for example, across several frames, and microprocessor 314 computes a mean and variance for both "on" and "off" cases. In one embodiment, microprocessor 314 selects the midpoint between the "on" and "off" power levels as the threshold. In other embodiments, microprocessor 314 selects other power levels as the threshold based on factors relating to the signal power levels as known to those skilled in the art. In any case, once microprocessor 314 determines the threshold, microprocessor 314 sends the threshold to a digital to analog converter 322. Digital to analog converter 322 then converts the digital signal from microprocessor 314 to an analog signal for use by comparator 318. In one embodiment, the threshold power level is periodically recomputed through new snapshots by A/D converter 320 and processing by microprocessor 314.

In many systems the frame timing is quite fast, such that the switching of circuitry 300 from downlink mode to uplink mode occurs in a small window between downlink transmissions and uplink transmissions. Thus, in one embodiment, switching from downlink mode to uplink mode is performed immediately once microprocessor 314 determines that switching should occur. In a dynamic duty cycle frame, the delay between the switching of circuitry 300 and the switching of base station 102 from downlink mode to uplink mode is determined by three factors. The first factor is the hardware delay of circuitry 300 which is due primarily to the decay time of RF detector 316. In one embodiment, the time constant of RF detector 316 is optimized for a fast fall time without allowing excessive ripple in the signal. The second factor is the firmware delay, which, in one embodiment, is approximately 2 microseconds due to interrupt handling. Finally, the third factor is due to signal propagation time from base station 102 to circuitry 300.

In the embodiment shown in FIG. 3, prior to the downlink signal reaching RF detector 316 and A/D converter 320, the signal is attenuated, if needed, by an attenuator 324. Attenuator 324 reduces the dynamic range required of A/D converter 320 by attenuating the power level of high powered signals, prior to the signals reaching A/D converter 320. Microprocessor 314 controls attenuator 324 based on the power level of signals read by RF detector 316 and A/D converter 320. In this embodiment, for example, the signal range requirements at downlink port 304 are 25 dB. Since RF detection occurs before switch 312, the signal range seen at coupler 315 is an additional 20 dB. Thus, the signal range seen at coupler 315 is approximately 45 dB. Attenuator 324 has an attenuation of 20 dB when enabled and 0 dB when disabled. When signal power levels at coupler 315 are in the top 20 dB of the range expected at coupler 315, microprocessor 314 enables attenuator 324 to reduce the signal levels at RF detector 316 and A/D converter 320 by 20 dB.

In one embodiment, microprocessor 314 determines whether to enable attenuator 324 prior to analyzing the downlink signal. At the start, microprocessor 314 enables attenuator 324 and then coupler 315 couples the downlink signal to attenuator 324, RF detector 316, and A/D converter 320. With attenuator 324 enabled, A/D converter 320 samples the downlink signal over a number of frames. Microprocessor 314 then receives the power level from A/C converter 320 and compares the power level to an attenuator threshold. If the average power level is below the attenuator threshold, microprocessor 314 disables attenuator 324. If the average power level is equal to or above the attenuator threshold, attenuator 324 remains enabled. More detail regarding the power level adjustment of attenuator 324 is provided in the '921 App.

Although specific embodiments have been illustrated and described herein, it will be appreciated by those of ordinary skill in the art that any arrangement, which is calculated to achieve the same purpose, may be substituted for the specific embodiments shown. It is manifestly intended that any inventions be limited only by the claims and the equivalents thereof.

What is claimed is:

1. A method of switching a communication device between an uplink communication path and a downlink communication path, the method comprising:
    measuring a power level of signals on at least one radio frequency for one of the uplink communication path and downlink communication path;
    comparing the measured power level with a threshold power level in order to determine if the communication device should switch between the uplink communication path and the downlink communication path; and
    when the comparison between the measured power level and the threshold power level indicates that the communication device should switch between the uplink communication path and the downlink communication path:
        performing a verification process to confirm that the communication device should switch between the uplink communication path and the downlink communication path;
        switching between the uplink communication path and the downlink communication path if the verification process confirms that the communication device should switch between the uplink communication path and the downlink communication path; and
        not switching between the uplink communication path and the downlink communication path if the verification process does not confirm that the communication device should switch between the uplink communication path and the downlink communication path.

2. The method of claim 1, wherein the comparison between the measured power level and the threshold power level indicates that the communication device should switch between the uplink communication path and the downlink communication path if the measured power level is less than or equal to the threshold power level.

3. The method of claim 1, wherein the verification process comprises continuing to compare the measured power level with the threshold power level for a predetermined amount of time, wherein the verification process fails if, during the predetermined amount of time, the comparison between the measured power level and the threshold power level does not indicate that the communication device should switch between the uplink communication path and the downlink communication path and otherwise the verification process succeeds.

4. The method of claim 1, wherein the verification process comprises comparing a time when the comparison between the measured power level and the threshold power level indicates that the communication device should switch between the uplink communication path and the downlink communication path with a known possible transmission boundary, wherein the verification process fails if the time when the comparison between the measured power level and the threshold power level indicates that the communication device should switch between the uplink communication path and the downlink communication path does not match the known possible transmission boundary and wherein the verification process succeeds if the time when the comparison between the measured power level and the threshold power level indicates that the communication device should switch between the uplink communication path and the downlink communication path does match the known possible transmission boundary.

5. The method of claim 4, wherein comparing the time when the comparison between the measured power level and the threshold power level indicates that the communication device should switch between the uplink communication path and the downlink communication path with the known possible transmission boundary comprises: measuring a length of a subframe; and comparing the measured length to a known possible subframe length.

6. The method of claim 1, wherein the verification process comprises performing two verifications process, wherein a first verification process comprises: continuing to compare the measured power level with the threshold power level for a predetermined amount of time, wherein the first verification process fails if, during the predetermined amount of time, the comparison between the measured power level and the threshold power level does not indicate that the communication device should switch between the uplink communication path and the downlink communication path and otherwise the first verification process succeeds;
wherein a second verification process comprises: comparing a time when the comparison between the measured power level and the threshold power level indicates that the communication device should switch between the uplink communication path and the downlink communication path with a known possible transmission boundary, wherein the verification process fails if the time when the comparison between the measured power level and the threshold power level indicates that the communication device should switch between the uplink communication path and the downlink communication path does not match the known possible transmission boundary and wherein the verification process succeeds if the time when the comparison between the measured power level and the threshold power level indicates that the communication device should switch between the uplink communication path and the downlink communication path does match the known possible transmission boundary,
wherein the first and second verification processes are performed in at least one of in parallel and contiguously; and
wherein the verification process succeeds if either of the first and second verification process succeeds and the verification process fails if neither of the first and second verification process succeeds.

7. The method of claim 1, wherein comparing the measured power level to a threshold power level compares the measure power level to a threshold power level determined by:
measuring an on power level of signals on the at least one radio frequency when transmissions are present on the at least one radio frequency;
measuring an off power level of signals on the at least one radio frequency when transmissions are not present on the at least one radio frequency; and
setting the threshold power level at a point between the on power level and the off power level.

8. An apparatus for switching between uplink and downlink transmission circuits, the apparatus comprising:
a switch having a first port coupled to an uplink circuit, and a second port coupled to a downlink circuit;
a power level detector configured to measure a power level of signals propagating through the switch;
a comparator configured to compare the measured power level to a threshold power level; and
a processing device configured to control the switch based on the comparison between the measured power level and the threshold power level;
wherein the processing device is further configured to do the following when the comparison between the measured power level and the threshold power level indicates that the switch should switch between an uplink communication path and a downlink communication path:
perform a verification process to confirm that the switch should switch between the uplink communication path and the downlink communication path;
switch between the uplink communication path and the downlink communication path if the verification process confirms that the switch should switch between the uplink communication path and the downlink communication path; and
not switch between the uplink communication path and the downlink communication path if the verification process does not confirm that the switch should switch between the uplink communication path and the downlink communication path.

9. The apparatus of claim 8, wherein the comparator is configured to determine when the measured power level is less than or equal to the threshold power level, wherein the comparison between the measured power level and the threshold power level indicates that the communication device should switch between the uplink communication path and the downlink communication path if the measured power level is less than or equal to the threshold power level.

10. The apparatus of claim 8, wherein the verification process comprises continuing to compare the measured power level with the threshold power level for a predetermined amount of time, wherein the verification process fails if, during the predetermined amount of time, the comparison between the measured power level and the threshold power level does not indicate that the communication device should switch between the uplink communication path and the downlink communication path and otherwise the verification process succeeds.

11. The apparatus of claim 8, wherein the verification process comprises comparing a time when the comparison between the measured power level and the threshold power level indicates that the communication device should switch between the uplink communication path and the downlink communication path with a known possible transmission boundary, wherein the verification process fails if the time when the comparison between the measured power level and the threshold power level indicates that the communication device should switch between the uplink communication path and the downlink communication path does not match the known possible transmission boundary and wherein the verification process succeeds if the time when the comparison between the measured power level and the threshold power level indicates that the communication device should switch between the uplink communication path and the downlink communication path does match the known possible transmission boundary.

12. The apparatus of claim 11, wherein comparing the time when the comparison between the measured power level and the threshold power level indicates that the communication device should switch between the uplink communication path and the downlink communication path with the known possible transmission boundary comprises: measuring a length of a subframe; and comparing the measured length to a known possible subframe length.

13. The apparatus of claim 8, wherein the verification process comprises performing two verifications process, wherein a first verification process comprises: continuing to compare the measured power level with the threshold power level for a predetermined amount of time, wherein the first verification process fails if, during the predetermined amount of time, the comparison between the measured power level and the threshold power level does not indicate that the communication device should switch between the uplink communication path and the downlink communication path and otherwise the first verification process succeeds;

wherein a second verification process comprises: comparing a time when the comparison between the measured power level and the threshold power level indicates that the communication device should switch between the uplink communication path and the downlink communication path with a known possible transmission boundary, wherein the verification process fails if the time when the comparison between the measured power level and the threshold power level indicates that the communication device should switch between the uplink communication path and the downlink communication path does not match the known possible transmission boundary and wherein the verification process succeeds if the time when the comparison between the measured power level and the threshold power level indicates that the communication device should switch between the uplink communication path and the downlink communication path does match the known possible transmission boundary,     wherein the first and second verification processes are performed in at least one of in parallel and contiguously; and     wherein the verification process succeeds if either of the first and second verification process succeeds and the verification process fails if neither of the first and second verification process succeeds.

14. The apparatus of claim 8, wherein the power level detector is configured to do at least one of:

measure the power level of signals that are coupled to a common connection of the switch; and     measure the power level of downlink signals before the downlink signals reach the switch.

15. A communication system comprising:

a plurality of remote antenna units communicatively coupled to a plurality of wireless terminals;

at least one hub communicatively coupled to the plurality of remote antenna units, the at least one hub configured to communicatively couple signals between a base station and the plurality of remote antenna units, the at least one hub further comprising:

a switch having a common connection, a first switched connection, and a second switched connection;

an uplink circuit coupled to the first switched connection and configured to receive signals from the plurality of wireless terminals;

a downlink circuit coupled the second switched connection and configured to transmit signals to the plurality of wireless terminals;

a duplexing circuit connected to the common connection and configured to transmit and receive signals from the base station; and         a processing device configured to compare a power level of signals in the duplexing circuit and a threshold power level in order to determine if the switch should switch between the first switched connection and the second switched connection;

wherein the processing device is further configured to do the following when the comparison between the power level of signals in the duplexing circuit and the threshold power level indicates that the switch should switch between the first switched connection and the second switched connection:

if the comparison between the power level of signals in the duplexing circuit and the threshold power level indicates that the switch should switch between the first switched connection and the second switched connection:

perform a verification process to confirm that the switch should switch between the first switched connection and the second switched connection;

switch between the first switched connection and the second switched connection if the verification process confirms that the switch should switch between the first switched connection and the second switched connection; and         not switch between the first switched connection and the second switched connection if the verification process does not confirm that the switch should switch between the first switched connection and the second switched connection.

16. The system of claim 15, further comprising:

a power level detector configured to measure a power level of signals in the duplexing circuit;

a comparator configured to compare the measured power level to a threshold power level; and     wherein the processing circuit is configured to control the switch based on the comparison of the measured power level and the threshold power level.

17. The system of claim 16, wherein the comparator is configured to send an interrupt signal to the processing device when the measured power level reaches the threshold power level.

18. The system of claim 17, wherein the processing device is configured to wait an amount of time after receiving an interrupt and before changing a position of the switch to verify that no more interrupts are received.

19. The system of claim 15, wherein the processing device is configured to control the switch based on a comparison between the time that the power level of signals on the duplexing circuit reaches a threshold power level and a time period of a transmission structure.

20. The system of claim 15, wherein the comparison between the comparison between the power level of signals in the duplexing circuit and the threshold power level indicates that the switch should switch between the first switched connection and the second switched connection if the power level of signals in the duplexing circuit is less than or equal to the threshold power level.

21. The system of claim 15, wherein the verification process comprises continuing to compare the power level of signals in the duplexing circuit with the threshold power level for a predetermined amount of time, wherein the verification process fails if, during the predetermined amount of time, the comparison between the power level of signals in the duplexing circuit and the threshold power level does not indicate that the communication device should switch between the first switched connection and the second switched connection and otherwise the verification process succeeds.

22. The system of claim 15, wherein the verification process comprises comparing a time when the comparison between the power level of signals in the duplexing circuit and the threshold power level indicates that the communication device should switch between the first switched connection and the second switched connection with a known possible transmission boundary, wherein the verification process fails if the time when the comparison between the power level of signals in the duplexing circuit and the threshold power level indicates that the communication device should switch between the first switched connection and the second switched connection does not match the known possible transmission boundary and wherein the verification process succeeds if the time when the comparison between the power level of signals in the duplexing circuit and the threshold power level indicates that the communication device should switch between the first switched connection and the second switched connection does match the known possible transmission boundary.

23. The system of claim 22, wherein comparing the time when the comparison between the power level of signals in the duplexing circuit and the threshold power level indicates that the communication device should switch between the first switched connection and the second switched connection with the known possible transmission boundary comprises: measuring a length of a subframe; and comparing the measured length to a known possible subframe length.

24. The system of claim 15, wherein the verification process comprises performing two verifications process, wherein a first verification process comprises: continuing to compare the power level of signals in the duplexing circuit with the threshold power level for a predetermined amount of time, wherein the first verification process fails if, during the predetermined amount of time, the comparison between the power level of signals in the duplexing circuit and the threshold power level does not indicate that the communication device should switch between the uplink communication path and the downlink communication path and otherwise the first verification process succeeds;

wherein a second verification process comprises: comparing a time when the comparison between the power level of signals in the duplexing circuit and the threshold power level indicates that the communication device should switch between the first switched connection and the second switched connection with a known possible transmission boundary, wherein the verification process fails if the time when the comparison between the power level of signals in the duplexing circuit and the threshold power level indicates that the communication device should switch between the uplink communication path and the downlink communication path does not match the known possible transmission boundary and wherein the verification process succeeds if the time when the comparison between the power level of signals in the duplexing circuit and the threshold power level indicates that the communication device should switch between the first switched connection and the second switched connection does match the known possible transmission boundary, wherein the first and second verification processes are performed in at least one of in parallel and contiguously; and wherein the verification process succeeds if either of the first and second verification process succeeds and the verification process fails if neither of the first and second verification process succeeds.

* * * * *